(12) United States Patent
Kim et al.

(10) Patent No.: US 12,425,502 B2
(45) Date of Patent: Sep. 23, 2025

(54) ELECTRONIC DEVICE AND COMMUNICATION CONTROL METHOD THEREOF

(71) Applicant: SAMSUNG ELECTRONICS CO., LTD., Suwon-si (KR)

(72) Inventors: Heetae Kim, Suwon-si (KR); Minsu Kim, Suwon-si (KR); Jungtae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 398 days.

(21) Appl. No.: 17/902,283

(22) Filed: Sep. 2, 2022

(65) Prior Publication Data
US 2023/0035808 A1 Feb. 2, 2023

Related U.S. Application Data

(63) Continuation of application No. PCT/KR2022/011065, filed on Jul. 27, 2022.

(30) Foreign Application Priority Data

Jul. 30, 2021 (KR) .................. 10-2021-0100786
Jan. 7, 2022 (KR) .................. 10-2022-0002537

(51) Int. Cl.
  *H04M 1/02* (2006.01)
  *H04W 76/30* (2018.01)
(52) U.S. Cl.
  CPC ....... *H04M 1/0241* (2013.01); *H04M 1/0216* (2013.01); *H04M 1/0268* (2013.01); *H04W 76/30* (2018.02)
(58) Field of Classification Search
  CPC ............ H04M 1/0241; H04M 1/0216; H04M 1/0268; H04M 1/72454; H04M 1/0214;
(Continued)

(56) References Cited

U.S. PATENT DOCUMENTS 11,252,268 B2 2/2022 Lee et al.
2013/0336304 A1 12/2013 Lim et al.
(Continued)

FOREIGN PATENT DOCUMENTS

CN       108227898    6/2018
EP         3940884    1/2022
(Continued)

OTHER PUBLICATIONS

Japanese Office Action issued Nov. 28, 2023 in corresponding Japanese Patent Application No. 2022-564351.
(Continued)

*Primary Examiner* — Zhitong Chen
(74) *Attorney, Agent, or Firm* — NIXON & VANDERHYE P.C.

(57) ABSTRACT

According to various embodiments, an electronic device may include: a housing, a flexible display configured to change in a form in response to a movement of the housing, a communication circuit configured to perform communication through a plurality of communication schemes, and a processor operatively connected to the communication circuit. The processor may be configured to: based on identifying that the form of the display is changed from a second form to a first form, control the communication circuit to perform a communication connection in a first communication connection scheme different from a second communication connection scheme designated for the second form among the plurality of communication schemes and perform communication through the first communication connection scheme in the first form.

16 Claims, 10 Drawing Sheets

(58) Field of Classification Search
CPC ..... H04W 76/30; H04W 36/14; H04W 36/36;
H04W 52/02; H04W 88/06; H04W 76/34;
H04W 84/18; G06F 1/16; G06F 1/1616;
G06F 1/1652; G06F 1/1677; Y02D 30/70
See application file for complete search history.

(56) References Cited

U.S. PATENT DOCUMENTS

| | | |
|---|---|---|
| 2014/0055344 A1 | 2/2014 | Seo et al. |
| 2014/0235228 A1 | 8/2014 | Hirako et al. |
| 2015/0268916 A1 | 9/2015 | Eisenberg |
| 2016/0100086 A1 | 4/2016 | Chien |
| 2016/0234465 A1 | 8/2016 | Binder |
| 2017/0244934 A1 | 8/2017 | Chien |
| 2018/0249054 A1 | 8/2018 | Chien |
| 2018/0332204 A1 | 11/2018 | Chien |
| 2019/0195445 A1 | 6/2019 | Chien |
| 2019/0388762 A1 | 12/2019 | Carney |
| 2020/0119432 A1* | 4/2020 | Mizunuma ............. H01Q 1/243 |
| 2020/0262090 A1 | 8/2020 | Binder |
| 2020/0329435 A1 | 10/2020 | Lee et al. |
| 2020/0374608 A1 | 11/2020 | Mazed |
| 2021/0067674 A1 | 3/2021 | Binder |
| 2021/0092686 A1 | 3/2021 | Noh et al. |
| 2021/0126992 A1 | 4/2021 | Jung et al. |
| 2021/0185809 A1 | 6/2021 | Park |
| 2022/0109472 A1 | 4/2022 | Na et al. |
| 2022/0166132 A1* | 5/2022 | Chu ..................... H04B 1/0064 |
| 2023/0198589 A1 | 6/2023 | Kim et al. |

FOREIGN PATENT DOCUMENTS

| | | |
|---|---|---|
| JP | 2003-158573 | 5/2003 |
| JP | 2005-159965 | 6/2005 |
| JP | 2014-146996 | 8/2014 |
| JP | 2020-065246 | 4/2020 |
| KR | 10-2013-0142413 | 12/2013 |
| KR | 10-2019-0050944 | 5/2019 |
| KR | 10-2020-0144772 | 12/2020 |
| KR | 10-2021-0033758 | 3/2021 |
| KR | 10-2021-0050906 | 5/2021 |
| KR | 10-2021-0058732 | 5/2021 |
| KR | 10-2021-0073999 | 6/2021 |
| KR | 10-2021-0125346 | 10/2021 |
| KR | 10-2345315 | 12/2021 |
| WO | 2020/187066 | 9/2020 |
| WO | 2020/238350 | 12/2020 |

OTHER PUBLICATIONS

Search Report and Written Opinion dated Oct. 24, 2022 issued in International Patent Application No. PCT/KR2022/011065.
Extended European Search Report dated Aug. 29, 2024 issued in European Patent Application No. 22849887.9.
Office Action for EP Application No. 22849887.9 dated Jun. 23, 2025, 6 pages.

* cited by examiner

FIG. 6
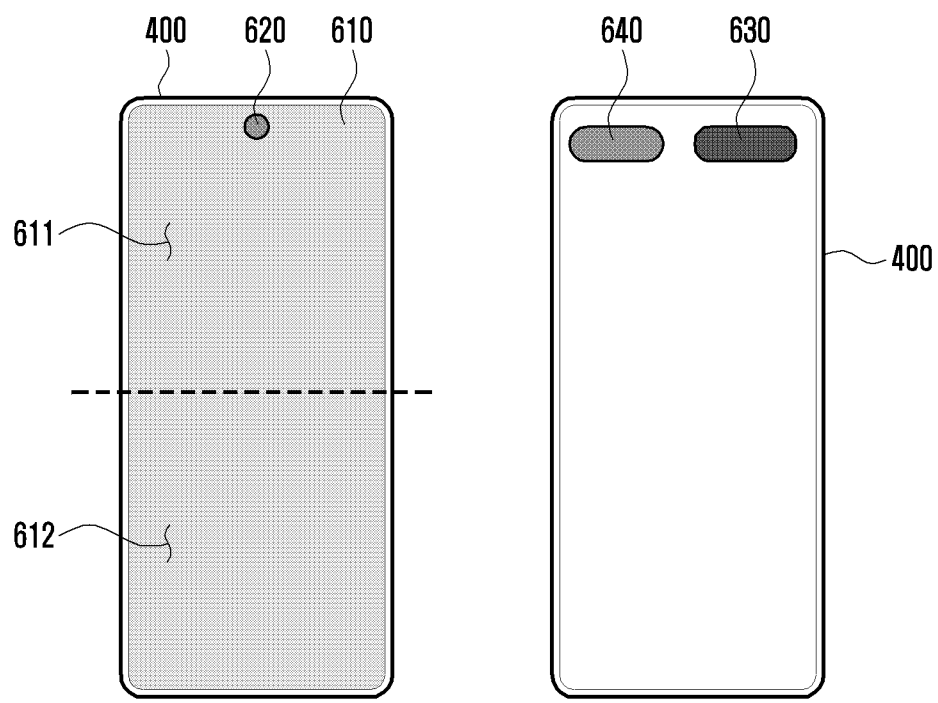
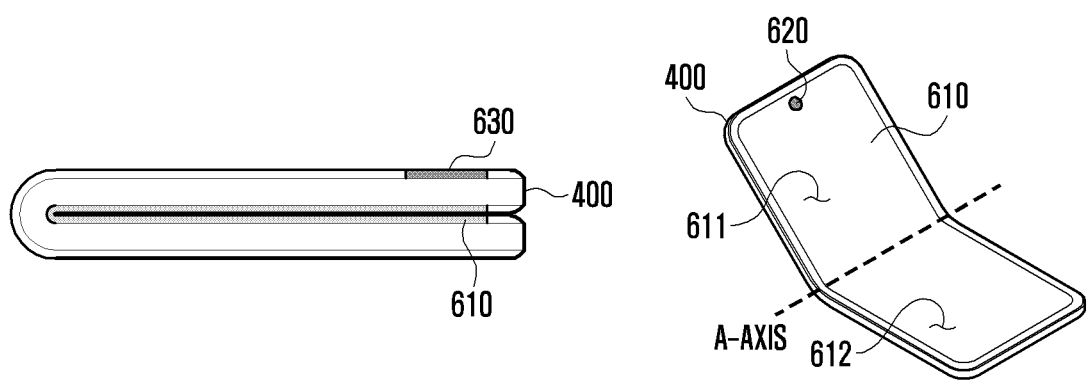

ELECTRONIC DEVICE AND COMMUNICATION CONTROL METHOD THEREOF

CROSS-REFERENCE TO RELATED APPLICATIONS

This application is a continuation of International Application No. PCT/KR2022/011065 designating the United States, filed on Jul. 27, 2022, in the Korean Intellectual Property Receiving Office and claiming priority to Korean Patent Application No. 10-2021-0100786, filed on Jul. 30, 2021, in the Korean Intellectual Property Office, and to Korean Patent Application No. 10-2022-0002537, filed on Jan. 7, 2022, in the Korean Intellectual Property Office, the disclosures of all of which are incorporated by reference herein in their entireties.

BACKGROUND

Field

The disclosure relates to an electronic device and a method for controlling communication thereof and, for example, to an electronic device and a method for controlling communication in response to a change in state of the electronic device.

Description of Related Art

A portable electronic device (hereinafter, 'electronic device') typified by a smartphone can be equipped with various functions. The electronic device includes a touch-screen-based display to allow the user to easily access various functions and is capable of providing screens of various applications through the display.

The electronic device is evolving into a variety of shapes beyond a traditional bar shape. Nowadays, the electronic device comes to have a foldable display further from a bendable display, and the display is being developed in the form of being expanded in a slide type or a rolling type. The electronic device including such a flexible display may change its own form. Resulting from a change in the form of the electronic device, services used may vary and accordingly network communication requirements may also vary.

Recently, the electronic device including a flexible display is being developed to be able to support communication through various frequency bands in accordance with various communication protocols. For example, the electronic device can perform communication by being connected to one access point (AP) or more through at least one of a plurality of frequency bands (e.g., 2.4 GHz or 5 GHz) according to a wireless communication protocol (e.g., WiFi). For example, the electronic device may communicate with a base station through at least one of 4G communication or 5G communication.

In order to meet the demand for radio data traffic having increased since deployment of 4th generation (4G) communication systems, efforts have been made to develop an improved $5^{th}$ generation (5G) or pre-5G communication system. Therefore, the 5G or pre-5G communication system is also called a beyond 4G network communication system or a post long term evolution (post LTE) system. To accomplish higher data rates, the 5G communication system is considered to be implemented in higher frequency (mmWave) bands (e.g., 6 GHz band or more) other than the legacy LTE band (e.g., 6 GHz band or less). In the 5G communication systems, beamforming, massive multiple-input multiple-output (massive MIMO), full dimensional MIMO (FD-MIMO), array antenna, an analog beamforming, and large scale antenna techniques are being discussed.

In case of the electronic device having the flexible display, as a used service is varied depending on the form of the electronic device, the type and/or parameter of requested network communication may also be different. Typically, when the form of the electronic device is changed in an environment that the electronic device is communicatively connected to an external electronic device, an additional operation is required so that a communication type and/or parameter can be applied depending on a service provided in a state where the form of the electronic device is changed.

SUMMARY

Embodiments of the disclosure adjust resources consumed for communication by changing a communication protocol and/or a frequency band in response to a change in a usage form of the electronic device including the flexible display.

Embodiments of the disclosure adjust resources consumed for communication by adjusting various communication parameters in response to a change in a usage form of the electronic device including the flexible display.

According to various example embodiments of the disclosure, an electronic device may include: a housing, a flexible display configured to change in a form in response to a movement of the housing, a communication circuit configured to perform communication through a plurality of communication schemes, and a processor operatively connected to the communication circuit. The processor may be configured to: upon identifying that the form of the display is changed from a second form to a first form, control the communication circuit to perform a communication connection in a first communication connection different from a second communication connection designated for the second form among the plurality of communication schemes and perform communication through the first communication connection in the first form.

According to various example embodiments of the disclosure, a method of operating an electronic device including a flexible display configured to change in a form may include: identifying that the form of the display is changed from a second form to a first form, and based on identifying a change to the first form, performing a communication connection in a first communication connection different from a second communication connection designated for the second form among a plurality of communication schemes.

According to various example embodiments of the disclosure, it is possible to perform communication by appropriately changing a communication protocol and/or a frequency band in response to a change in a usage form of the electronic device including the flexible display. Therefore, it is possible to increase the battery usage efficiency of the electronic device and, if necessary, to enable fast communication.

According to various example embodiments of the disclosure, it is possible to perform communication by appropriately changing various communication parameters in response to a change in a usage form of the electronic device including the flexible display. Therefore, it is possible to increase the battery usage efficiency of the electronic device and, if necessary, to enable fast communication.

In addition, various effects explicitly or implicitly appreciated through the disclosure may be provided.

BRIEF DESCRIPTION OF THE DRAWINGS

In connection with the description of the drawings, the same or similar reference numerals may be used for the same or similar components. Further, the above and other aspects, features and advantages of certain embodiments of the present disclosure will be more apparent from the following detailed description, taken in conjunction with the accompanying drawings, in which:

FIGS. 5, 6 and 7 are diagrams illustrating examples of the structure and a change in form of an electronic device having a flexible display according to various embodiments;

DETAILED DESCRIPTION

Figure 1:
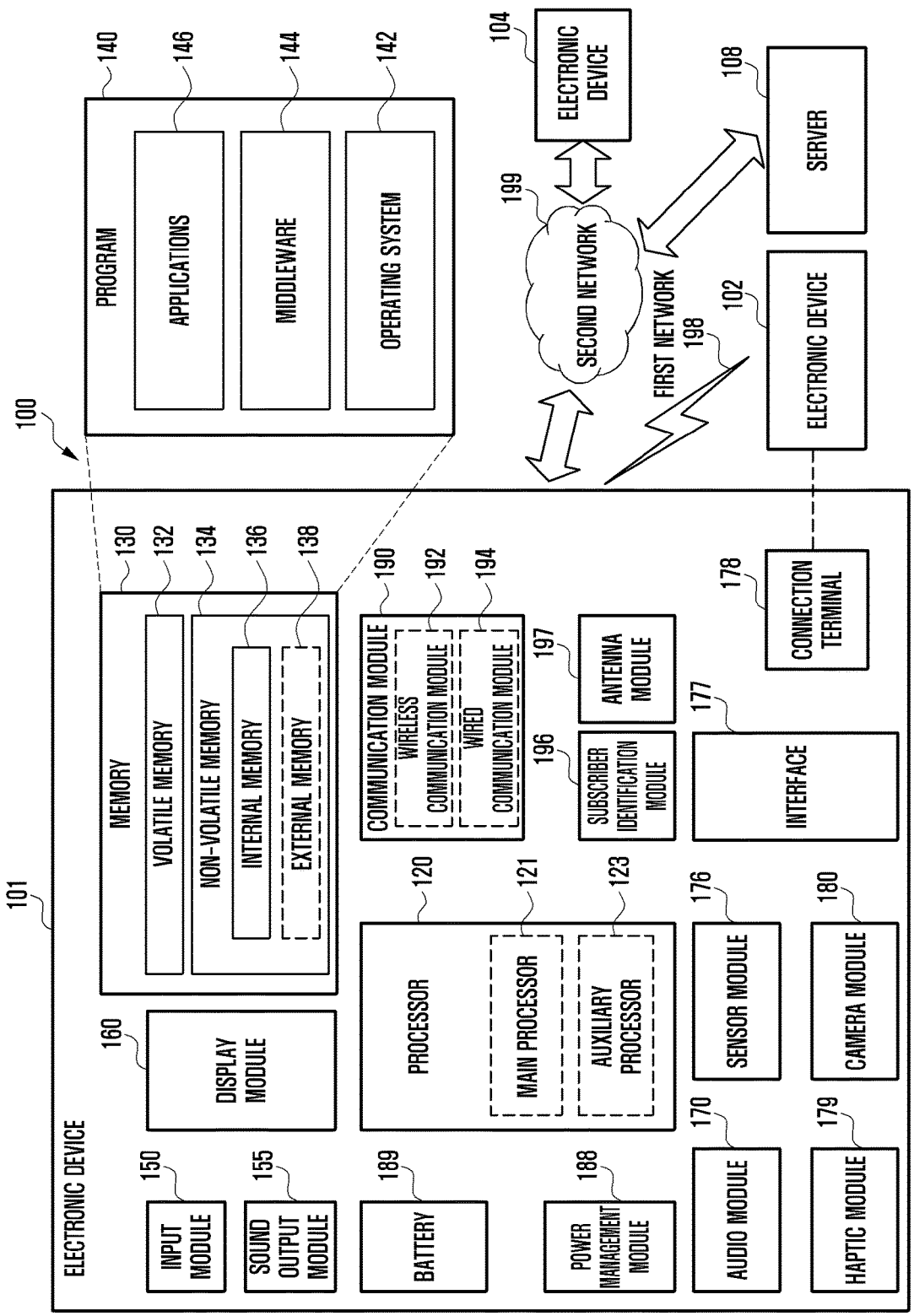
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1 module 150, a sound output 1 module 155, a display 1 module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the 11 connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1 module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input 1 module 150 may receive a command or data to be used by another component (e.g., the processor 120) of the electronic device 101, from the outside (e.g., a user) of the electronic device 101. The input 1 module 150 may include, for example, a microphone, a mouse, a keyboard, a key (e.g., a button), or a digital pen (e.g., a stylus pen).

The sound output 1 module 155 may output sound signals to the outside of the electronic device 101. The sound output 1 module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 1 module 160 may visually provide information to the outside (e.g., a user) of the electronic device 101. The display 1 module 160 may include, for example, a display, a hologram device, or a projector and control circuitry to control a corresponding one of the display, hologram device, and projector. According to an embodiment, the display 1 module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1 module 150, or output the sound via the sound output 1 module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
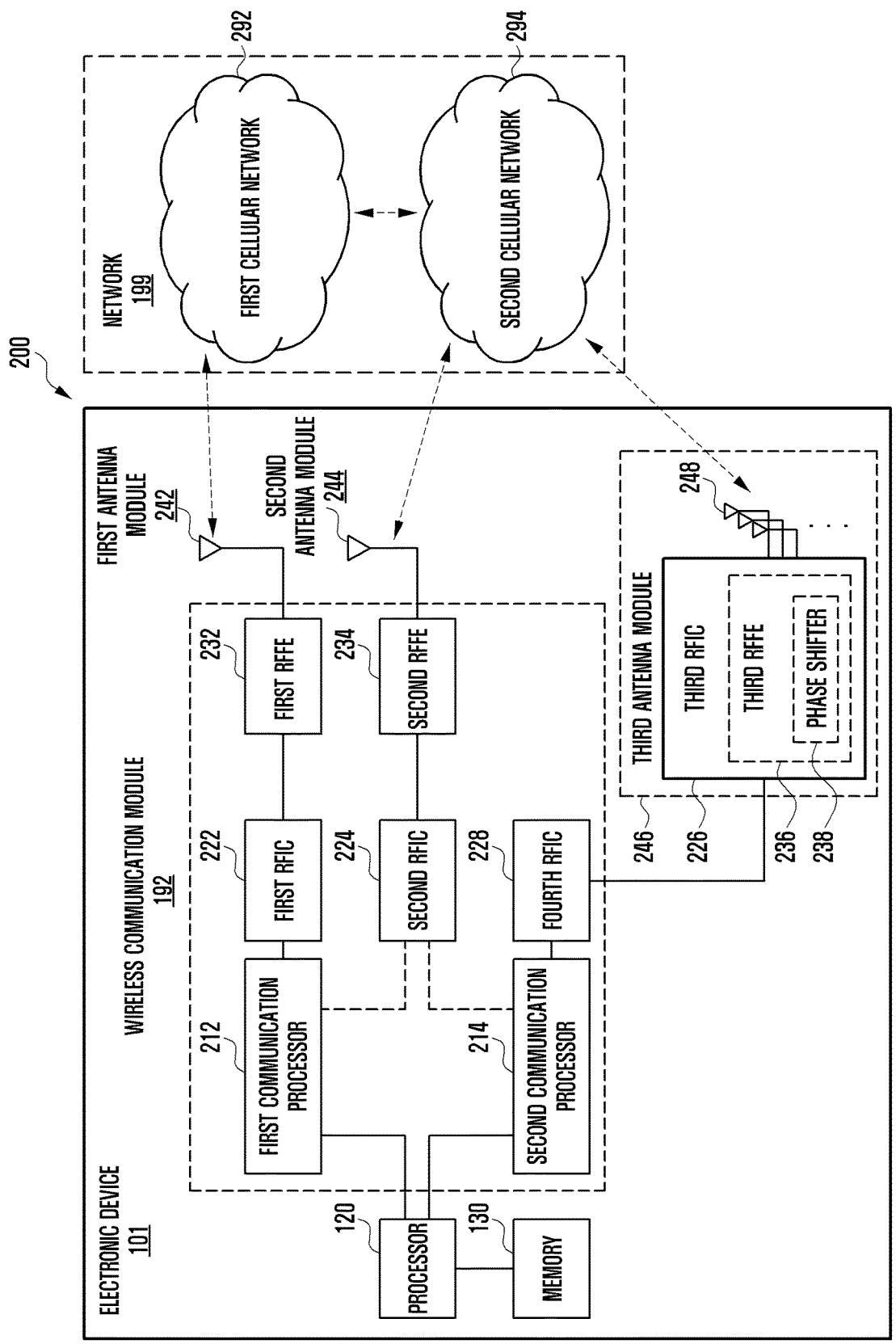
FIG. 2 is a block diagram illustrating an example configuration of an electronic device for supporting legacy network communication and 5G network communication according to various embodiments.

FIG. 2 is a block diagram illustrating an example configuration of an electronic device in a network environment including a plurality of cellular networks according to various embodiments.

Referring to FIG. 2, the electronic device 101 may include a first communication processor (e.g., including communication circuitry) 212, second communication processor (e.g., including communication circuitry) 214, first RFIC 222, second RFIC 224, third RFIC 226, fourth RFIC 228, first radio frequency front end (RFFE) 232, second RFFE, 234, first antenna module 242, second antenna module 244, and antenna 248. The electronic device 101 may include a processor (e.g., including processing circuitry) 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may include various processing circuitry and establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE, 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE, 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
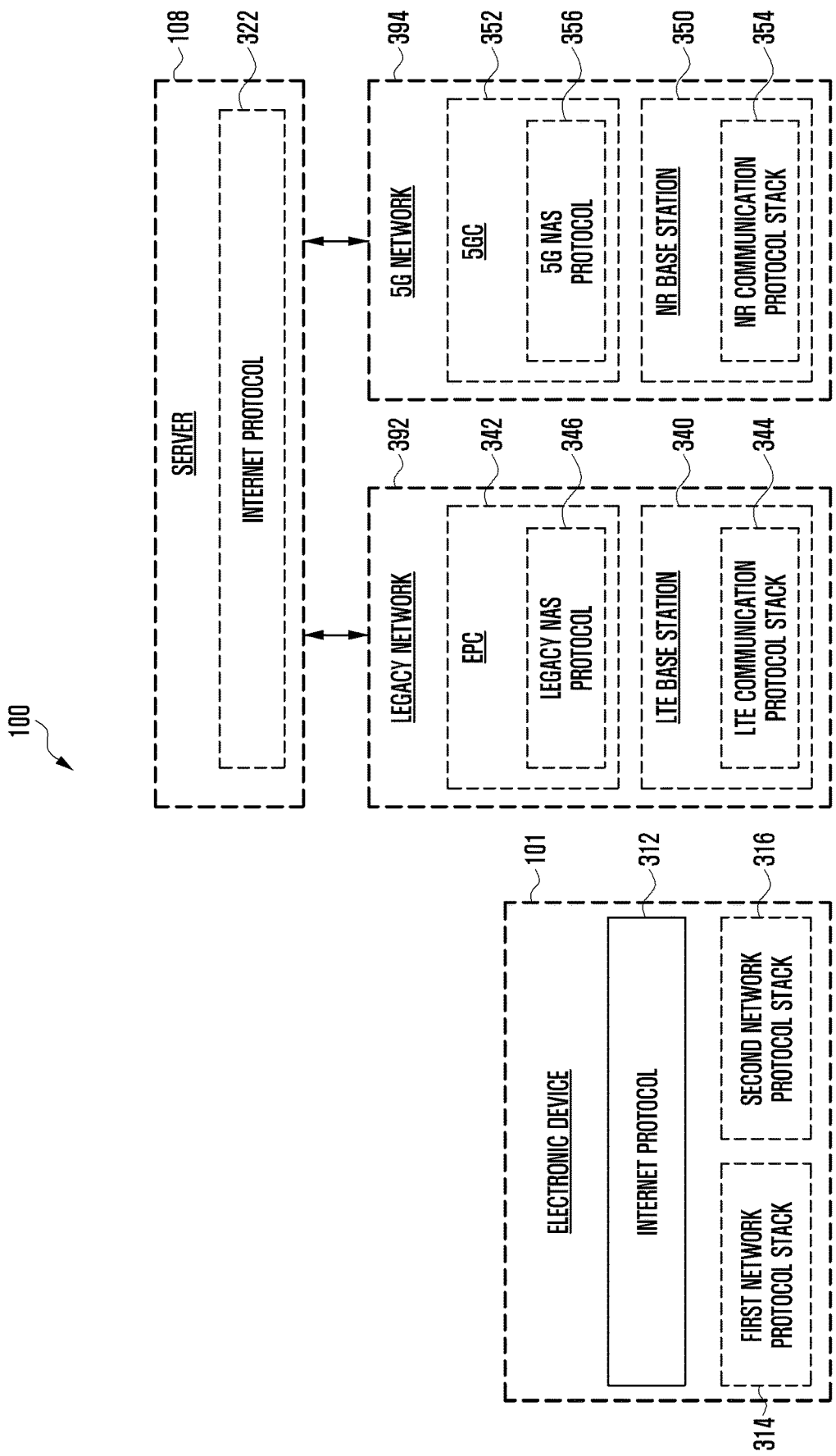
FIG. 3 is a diagram illustrating a protocol stack structure of a network of legacy communication and/or 5G communication according to various embodiments.

FIG. 3 is a diagram illustrating an example protocol stack structure of the network 100 of legacy communication and/or 5G communication according to various embodiments.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Interne communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to an embodiment, the electronic device 101 may perform wireless communication with the legacy network 392 through the first communication protocol stack 314. According to an embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to an embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4:
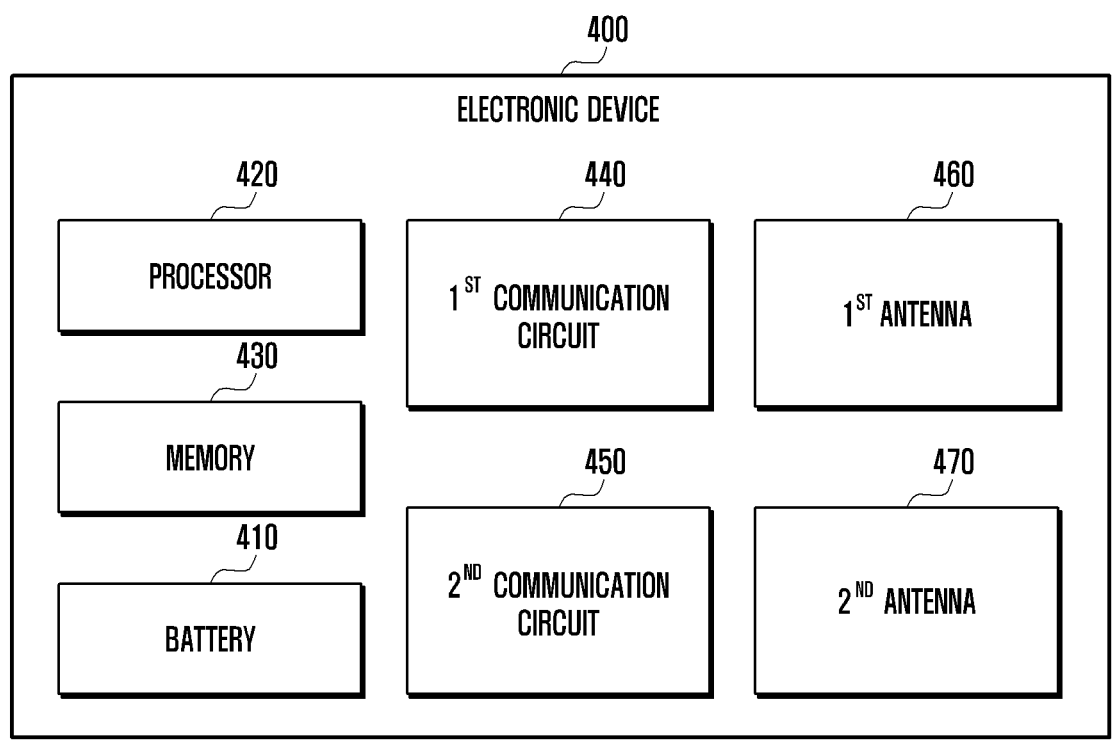
FIG. 4 is a block diagram illustrating an example configuration of an electronic device according to various embodiments.

FIG. 4 is a block diagram illustrating an example configuration of an electronic device 400 (e.g., the electronic device 101 in FIG. 1) according to various embodiments.

With reference to FIG. 4, the electronic device 400 may include a processor (e.g., including processing circuitry) 420 (e.g., the processor 120 in FIG. 1), a memory 430 (e.g., the memory 130 in FIG. 1), a first communication circuit 440 (e.g., the communication module 190 in FIG. 1), a second communication circuit 450 (e.g., the communication module 190 in FIG. 1), a first antenna 460 and a second antenna 470. A battery 410 (e.g., the battery 189 in FIG. 1) may supply power to at least one component of the electronic device 400.

According to an embodiment, the processor 420 may include various processing circuitry and support cellular wireless communication and/or short-range wireless communication through the first communication circuit 440 and/or the second communication circuit 450. The cellular wireless communication and/or short-range wireless communication may refer to various communication schemes that the electronic device 400 can support.

According to an embodiment, the wireless communication that the electronic device 400 can support through the first communication circuit 440 and/or the second communication circuit 450 may include cellular communication via the legacy network 392 or the 5G network 394 as shown in FIG. 3. For example, the wireless communication may include 4G, LTE, or 5G communication of 3GPP standard.

According to an embodiment, the wireless communication that the electronic device 400 can support through the first communication circuit 440 and/or the second communication circuit 450 may include Wi-Fi of various bands. For example, the wireless communication may include communication in various frequency bands such as 2.5 GHz, 5 GHz, and 6 GHz in accordance with various Wi-Fi related standards.

According to an embodiment, the first communication circuit 440 may include, for a first communication connection, a communication processor (e.g., the first communication processor 212 in FIG. 2), an RFIC (e.g., the first RFIC 222 in FIG. 2), and/or an RFFE (e.g., the first RFFE 232 in FIG. 2).

According to an embodiment, the second communication circuit 450 may include, for a second communication connection, a communication processor (e.g., the second communication processor 214 in FIG. 2), an RFIC (e.g., the third RFIC 226 in FIG. 2), and/or an RFFE (e.g., the third RFFE 236 in FIG. 2). For example, the processor 420 may control the first communication circuit 440 and/or the second communication circuit 450 to transmit and/or receive data through the first communication connection and/or the second communication connection.

According to an embodiment, the processor 420 may perform wireless communication through the first communication circuit 440 and/or the second communication circuit 450. In this case, a signal transmitted or received via the first communication circuit 440 may be transmitted or received through a first antenna 460, and a signal transmitted or received via the second communication circuit 450 may be transmitted or received through a second antenna 470.

According to an embodiment, the first communication connection and the second communication connection may be different communication schemes. For example, the first communication connection may be LTE communication, and the second communication connection may be 5G communication. In another example, the first communication connection may be WiFi 2.5 GHz frequency band communication, and the second communication connection may be WiFi 5 or 6 GHz frequency band communication. In yet another example, the first communication connection may be 5G first frequency band (e.g., 6 GHz or less) communication, and the second communication connection may be 5G second frequency band (e.g., mmWave) communication.

According to an embodiment, the first communication connection and the second communication connection may be the same communication scheme. In this case, the first and second communication connections may be based on the same communication scheme, but may have different communication parameters. For example, the first and second communication connections may include a case in which a specific parameter (e.g., a wake to sleep time and/or a delivery traffic indication message interval) is configured differently in a connection state through the WiFi network. In another example, the first and second communication connections may include a case in which a specific parameter (e.g., a scan interval) is configured differently in a connection state through the Bluetooth or Bluetooth low energy (BLE) network.

According to an embodiment, the processor 420 may perform wireless communication based on the first communication connection and/or the second communication connection through the first communication circuit 440 and/or the second communication circuit 450. For example, when the first communication connection and the second communication connection are based on different schemes of communication, the processor 420 may perform the first communication connection through the first communication circuit 440 and perform the second communication connection through the second communication circuit 450. In another example, when the first communication connection and the second communication connection are based on the same scheme of communication, the processor 420 may perform the first and second communication connections through the first communication circuit 440 or through the second communication circuit 450.

According to an embodiment, a frequency of a signal transmitted/received through the first communication circuit 440 may be different from a frequency of a signal transmitted/received through the second communication circuit 450. For example, in one case, a frequency band of a signal processed by the first communication circuit 440 and transmitted/received through the first antenna 460 may include a WiFi 2.4 GHz frequency band. In this case, a frequency band of a signal processed by the second communication circuit 450 and transmitted/received through the second antenna 470 may include a WiFi 5 GHz or 6 GHz frequency band. For example, in another case, a frequency band of a signal processed by the first communication circuit 440 and transmitted/received through the first antenna 460 may include a 5G first band (e.g., below 6). In this case, a frequency band of a signal processed by the second communication circuit 450 and transmitted/received through the second antenna 470 may include a 5G second band (e.g., mmWave).

Figure 5:
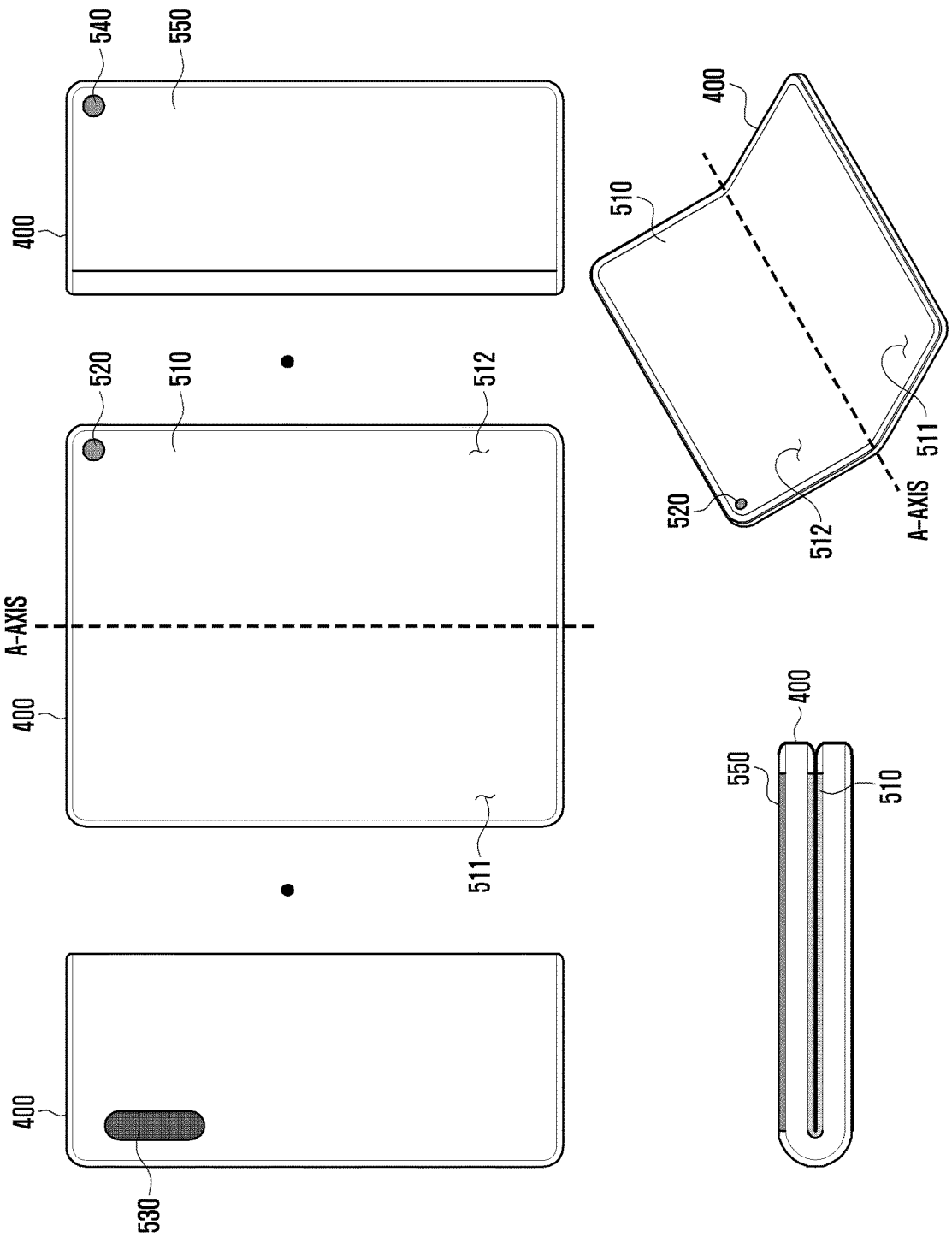

FIG. 5 is a diagram illustrating an example of a structure and a change in shape of an electronic device having a flexible display according to various embodiments.

With reference to FIG. 5, the electronic device (e.g., the electronic device 400 in FIG. 4) having the flexible display (e.g., a first display 510) according to various embodiments may be a foldable electronic device. According to various embodiments, the first display 510 of the electronic device 400 may include at least a part of the structure and/or function of the display module 160 shown in FIG. 1.

The foldable electronic device 400 (e.g., the electronic device 101 in FIG. 1) according to various embodiments may include two housings based on a folding axis (e.g., A-axis), a flexible display 510 (e.g., the display module 160 in FIG. 1), a front camera 520 (e.g., the camera module 180 in FIG. 1), an auxiliary display 530 (e.g., the display module 160 in FIG. 1, a second display), and a rear camera 540 (e.g., the camera module 180 in FIG. 1), and may include at least a part of the components and/or function of the electronic device 101 shown in FIG. 1. The two housings may be folded about at least one axis and overlapped with each other by a hinge structure.

Of two cases of the housing of the electronic device 400, a first case may have a first surface and a second surface, and a second case may have a third surface and a fourth surface. For example, a form in which the first display 510 of the electronic device 400 is folded along the A-axis may refer to a state in which the first surface of the first case faces and overlaps the third surface of the second case. In this folded form of the electronic device, an angle (e.g., angle A) between the first surface of the first case and the third surface of the second case may be a narrow angle (e.g., 0 to 5 degrees). For example, the folded form of the electronic device 400 may include a closed form (or referred to as a close state or a closed state) or a fully folded form. The first display 510 may be divided into a first area 511 and a second area 512 as an area that is physically folded and divided. The first area may be located on the first surface of the first case, and the second area may be located on the third surface of the second case. The first case and the second case may be disposed on both sides about the folding axis (e.g., the A-axis), respectively, and may have an overall symmetrical shape with respect to the folding axis. With reference to FIG. 5, the first case may be located on the left side with respect to the folding axis, and the second case may be located on the right side with respect to the folding axis. The first case and the second case may be designed to be folded with respect to each other, and may be superimposed so that the first surface of the first case and the third surface of the second case face each other in the folded form or state.

According to various embodiments, a hinge is formed between the first case and the second case, so that the first and second cases of the electronic device 400 can be overlapped and folded with each other. A housing structure arranged left and right with respect to the folding axis of the electronic device is only an example, and another housing structure arranged vertically with respect to the folding axis of the electronic device is also possible.

Depending on whether the electronic device 400 is in an unfolded form (or an open form), a folded form (or a closed form), or an intermediate form, the first and second cases may have a different angle (e.g., angle A) or distance therebetween. An unfolded form of the first display 510 may include an open form (or an open state or an opened state) or a flat form (or a flat state). For example, the unfolded form may include a state in which the first and second cases of the electronic device 400 are disposed at a predetermined angle (e.g., 80 degrees or 120 degrees) or more and thus the first display is exposed.

The electronic device may include a second display 550 (e.g., the display module 160 in FIG. 1) in at least a part of the first case or the second case. With reference to FIG. 5, the second display 550 may be formed on at least a portion of the second surface of the first case of the electronic device 400. The second display 550 may be disposed on the fourth surface of the second case, or may be formed through a part or whole of the second surface of the first case and the fourth surface of the second case. The second display may include at least a part of the structure and/or function of the display module 160 shown in FIG. 1.

FIG. 6 is a diagram illustrating an example structure and a change in form of an electronic device having a flexible display according to various embodiments.

With reference to FIG. 6, a foldable electronic device (e.g., the electronic device 400 in FIG. 4) according to various embodiments may include two housings based on a folding axis (e.g., A-axis), a flexible display 610 (e.g., the display module 160 in FIG. 1, a first display), a front camera 620 (e.g., the camera module 180 in FIG. 1), an auxiliary display 630 (e.g., the display module 160 in FIG. 1, a second display), and a rear camera 640 (e.g., the camera module 180 in FIG. 1), and may include at least a part of the components and/or function of the electronic device 101 shown in FIG. 1. The two housings may be folded about at least one axis and overlapped with each other by a hinge structure.

A first case and a second case may be disposed at upper and lower sides about the folding axis (e.g., the A-axis), respectively, and may have an overall symmetrical shape with respect to the folding axis. With reference to FIG. 6, the first case may be located at the upper side with respect to the folding axis, and the second case may be located at the lower side with respect to the folding axis. The first case and the second case may be designed to be folded with respect to each other, and may be superimposed so that a first surface of the first case and a third surface of the second case face each other in a folded form or state.

According to various embodiments, a hinge is formed between the first case and the second case, so that the first and second cases of the electronic device 400 can be overlapped and folded with each other. A housing structure arranged vertically with respect to the folding axis of the electronic device is only an example, and another housing structure arranged left and right with respect to the folding axis of the electronic device is also possible.

Depending on whether the flexible display 610 (including a first display area 611 and second display area 612) of the electronic device 400 is in an unfolded form (or an open form), a folded form (or a closed form), or an intermediate form, the first and second cases may have a different angle (e.g., angle A) or distance therebetween. For example, the folded form may include a closed form (or referred to as a close state or a closed state) or a fully folded form. For example, in the folded form, the first surface of the first case and the third surface of the second case may face and overlap each other. For example, in the folded form, an angle (e.g., angle A) between the first surface of the first case and the third surface of the second case may be a narrow angle (e.g., 0 to 5 degrees). For example, the unfolded form may refer to an open form (or an open state or an opened state) or a flat form (or a flat state). For example, the unfolded form may include a state in which the first and second cases of the electronic device 400 are disposed at a predetermined angle (e.g., 80 degrees or 120 degrees) or more and thus the first display is exposed.

Figure 7:
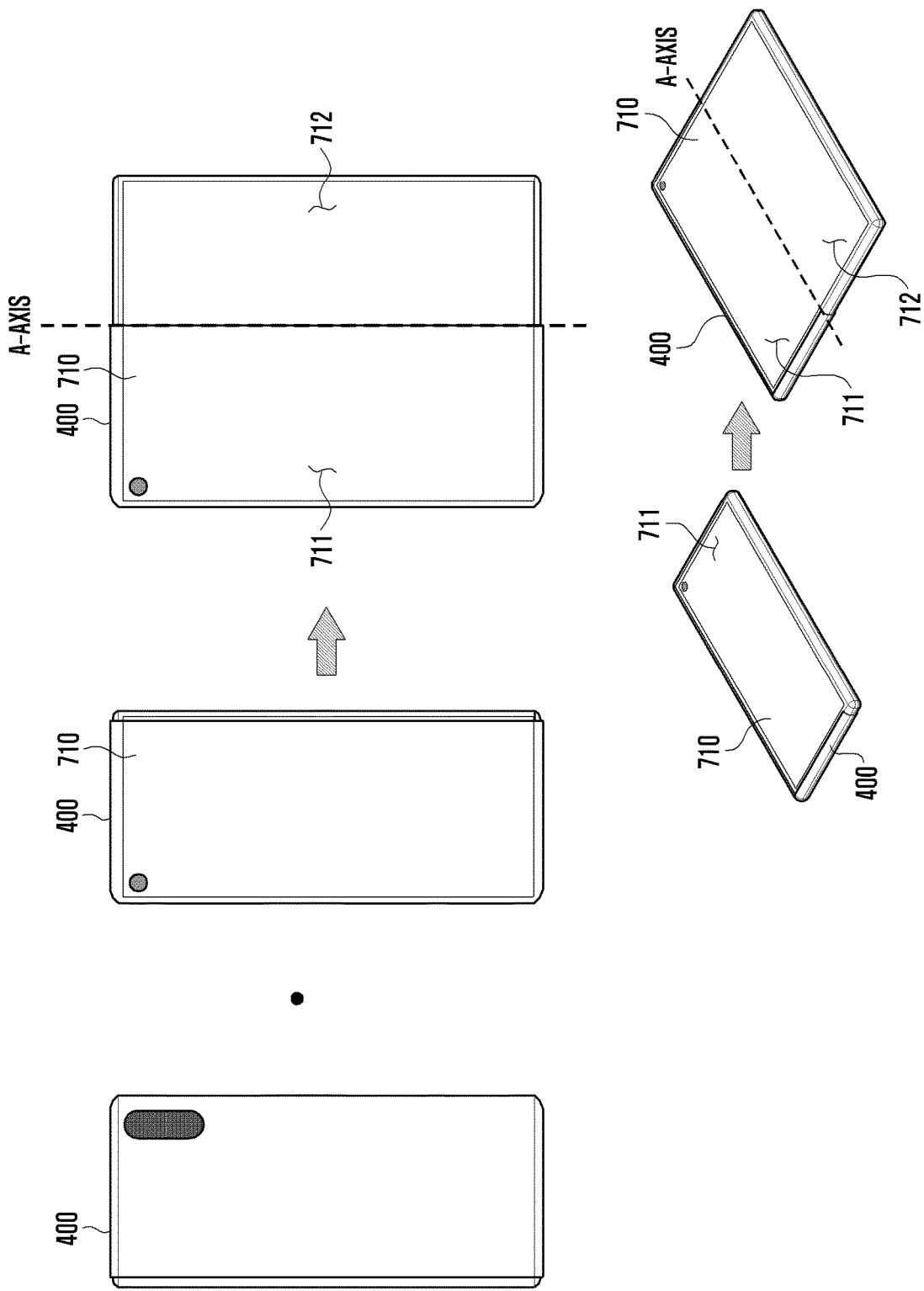

FIG. 7 is a diagram illustrating an example structure and a change in form of an electronic device having a flexible display according to various embodiments.

The electronic device (e.g., the electronic device 400 in FIG. 4) having the flexible display according to various embodiments may be a rollable electronic device or slidable electronic device having a rollable display.

With reference to FIG. 7, the electronic device 400 according to various embodiments may include a housing and a flexible display 710, and may include at least a part of the components and/or function of the electronic device 101 shown in FIG. 1. A portion of the flexible display 710 may be rolled or folded inside the housing, and may be spread left and right through at least one roller structure or the like.

The flexible display 710 may be physically divided into a first area 711 and a second area 712. The first area 711 may correspond to a region in which display contents of the electronic device 700 are displayed in a roll-in or slide-in form of the flexible display 710. The second area 712 may correspond to an additional region in which display contents of the electronic device 700 are displayed in a roll-out or slide-out form of the flexible display 710. The additional region may refer to an expanded display area other than the first area 711 of the flexible display 710 in which display contents are displayed in the roll-in or slide-in form.

With reference to FIG. 7, the roll-in form or slide-in form of the flexible display 710 of the electronic device 700 may be included in the folded form as described with reference to FIG. 5 or 6. Also, the roll-out form or slide-out form of the flexible display 710 of the electronic device 700 may be included in the unfolded form as described with reference to FIG. 5 or 6.

According to various example embodiments, an electronic device (e.g., the electronic device 400 in FIG. 4) may include: a housing, a flexible display (e.g., the display 510 in FIG. 5, the display 610 in FIG. 6, or the display 710 in FIG. 7) configured to change in a form in response to a movement of the housing, a communication circuit (e.g., the communication module 190 in FIG. 1 or the communication circuits 440 and 450 in FIG. 4) configured to perform communication through a plurality of communication schemes, and a processor (e.g., the processor 120 in FIG. 1 or the processor 420 in FIG. 4) operatively connected to the communication circuit. The processor may be configured to: based on identifying that the form of the display is changed from a second form to a first form, control the communication circuit to perform a communication connection in a first communication connection scheme different from a second communication connection scheme designated for the second form among the plurality of communication schemes and perform communication through the first communication connection scheme in the first form.

According to various example embodiments, the first form may include a folded state, and the second form may include an unfolded state.

According to various example embodiments, the first communication connection scheme may include a communication connection based on a 4th generation (4G) mobile communication scheme, and the second communication connection scheme may include a communication connection based on a 5th generation (5G) mobile communication scheme.

According to various example embodiments, the processor may be configured to: based on identifying that the form of the display is changed from the first form to the second form, control the communication circuit to release the first communication connection scheme designated for the first form and perform communication through the second communication connection scheme designated for the second form.

According to various example embodiments, the processor may be configured to control the communication circuit to transmit a first communication connection request message to a base station to release the first communication connection.

According to various example embodiments, the processor may be configured to control the communication circuit to not transmit the first communication connection request message after waiting for release of the first communication connection.

According to various example embodiments, the first communication connection scheme may include a communication connection based on a communication scheme using a first frequency band, and the second communication connection scheme may include a communication connection based on a communication scheme using a second frequency band higher than the first frequency band.

According to various example embodiments, the processor may be configured to: based on identifying that the form of the display is changed from the second form to the first form, change at least one of a delivery traffic indication message (DTIM) interval and a wake to sleep time to be different from an interval in the second form, the wake to sleep time being a next data reception waiting time after receiving a data packet.

According to various example embodiments, the processor may be configured to change the wake to sleep time to be longer based on continuous reception being identified by analyzing a reception pattern of the data packet upon receiving the data packet.

According to various example embodiments, the processor may be configured to control the communication circuit to periodically scan a nearby Bluetooth low energy (BLE) device in response to a BLE or Bluetooth (BT) communication connection in the second form, and to limit a scan operation for the nearby BLE device in response to a change to the first form.

Figure 8:
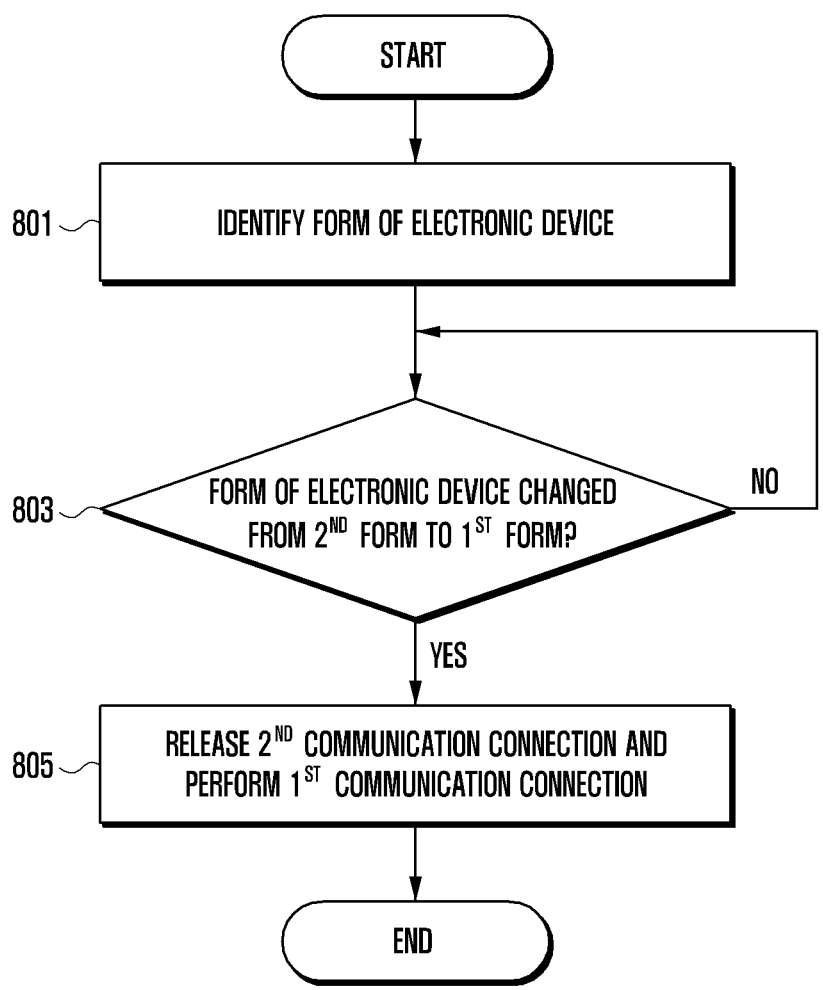
FIG. 8 is a flowchart illustrating an example communication control operation of an electronic device according to various embodiments.

FIG. 8 is a flowchart illustrating an example communication control operation of an electronic device (e.g., the electronic device 400 in FIGS. 4 to 7) according to various embodiments.

According to various embodiments, in a first form (e.g., a folded form or a roll-in form), the processor 420 may enable the electronic device 400 to perform communication based on a first communication connection. On the other hand, in a second form (e.g., an unfolded form or a roll-out form), the electronic device 400 may perform communication based on a second communication connection. In this case, the processor 420 may perform operations opposite to the operations described below.

According to various embodiments, at operation 801, the processor (e.g., the processor 420 in FIG. 4) of the electronic device 400 may identify the form of the electronic device 400. For example, the processor 420 may periodically identify the form of the electronic device 400. For example, the processor 420 may detect a change in form (e.g., folding or unfolding, roll-in or roll-out) of the electronic device 400. For example, the processor 400 may detect a change in the form of the electronic device 400 and identify the form of the electronic device 400 at a point in time when a form change operation is started, a change is in progress, or a change is completed.

According to various embodiments, the form of the electronic device 400 may be, for example, a form constructed by the electronic device or the flexible display (e.g., the flexible display 610 or 710 in FIG. 6 or 7). The form of the electronic device 400 may be a form constructed by the housing or case that physically contains other components of the electronic device 400 including the flexible display. According to various embodiments, the form of the flexible display 210 may be changed depending on a form constructed by the housing or case of the electronic device.

According to various embodiments, the processor 420 may detect the form of the electronic device 400 through a form detection sensor (e.g., the sensor module 176 in FIG. 1). According to various embodiments, the processor 420 may detect the form of the electronic device 400 using various sensors such as an angle sensor (not shown) or a magnetic sensor (not shown) capable of sensing an unfolded/folded state (e.g., in case of a foldable display), a folding angle, a rolling state (e.g., in case of a slidable display), or a rolling degree of the electronic device 400.

According to various embodiments, the form of the electronic device 400 may be defined based on a folding angle of the electronic device 400. For example, the electronic device 400 including a flexible display that is being foldable (e.g., a foldable display) may assume the degree of folding as a current form of the electronic device. In this case, the form of the electronic device may be detected using a folding angle detected by an angle sensor. According to an embodiment, the form of the electronic device may be defined as the degree of rolling of the electronic device. For example, in case of an electronic device including the flexible display 210 capable of rolling/sliding (e.g., a rollable display, a slidable display), the current form of the electronic device may be defined by the degree of rolling/sliding. In this case, the form of the electronic device may be detected using a sliding-out length of the flexible display 210. Alternatively, the form of the electronic device may be detected using the degree of sliding expressed as a percentage (e.g., 0%-100%) of the sliding-out of the flexible display 210.

According to various embodiments, at operation 803, the processor 420 may determine whether the form of the electronic device 400 is changed. For example, the processor 420 may compare the current form of the electronic device 400 with a previous form and thereby determine whether a change in form has occurred. For example, the form of the electronic device 400 may be changed from a second form to a first form. Hereinafter, by way of non-limiting example, a case that the second form is changed to the first form will be described. In another case that the first form is changed to the second form, the reverse operation to the following operation may be performed.

According to an embodiment, the first form may include a folded form. The folded form of the electronic device 400 may include a state in which an angle (e.g., angle A) between the two cases of the electronic device 400 forms a narrow angle (e.g., 0 to 5 degrees) and thus the flexible display is almost closed or folded. The definition of the folded form is only an example and may be applied differently depending on various implementations.

According to an embodiment, the second form may include an unfolded form. The unfolded form of the electronic device may include a state in which the flexible display is unfolded in an open form (or an open state or an opened state) or a flat form (or a flat state). For example, the unfolded form may include a state in which an angle (e.g., angle A in FIG. 6 or 7) between the two cases of the electronic device 400 forms at a predetermined angle (e.g., 80 degrees or 120 degrees) or more and thus the flexible display is exposed. The definition of the unfolded form is only an example and may be applied differently depending on various implementations. According to an embodiment, the change from the folded form to the unfolded form may include a state in which the electronic device transitions from the folded form to the unfolded form as the folding angle and/or rolling/sliding degree increases.

According to an embodiment, the change from the unfolded form to the folded form may include a state in which the electronic device transitions from the unfolded form to the folded form as the folding angle and/or rolling/sliding degree decreases.

According to an embodiment, in case that the electronic device 400 includes the rollable or slidable display 210, the first form may include an unrolled or roll-in form or a slide-in form, and the second shape may include a roll-out form or a slide-out form. For example, compared to the first form, the second form of the electronic device 400 may have a relatively large exposed area of the display.

According to an embodiment, the change from the roll-in or slide-in form to the roll-out or slide-out form may include a state in which the electronic device transitions from the rolled-in or slide-in form to the roll-out or slide-out form as the exposed area of the display increases.

According to an embodiment, the change from the roll-out or slide-out form to the roll-in or slide-in form may include a state in which the electronic device transitions from the rolled-out or slide-out form to the roll-in or slide-in form as the exposed area of the display decreases.

According to various embodiments, when it is determined that the form of the electronic device 400 is changed from the second form to the first form (YES branch of the operation 803), the processor 420 may release a second communication connection and perform a first communication connection at operation 805.

According to an embodiment, when the form of the electronic device 400 is the second form (e.g., when the second form is maintained) (NO branch of the operation 803), the processor 420 may control the communication module 190 to perform communication through the second communication connection (e.g., maintain the second communication connection). When the form of the electronic device 400 is the first form, the processor may control the communication module 190 to perform communication through the first communication connection.

According to an embodiment, the first communication connection and the second communication connection may include various communication schemes such as various cellular communication schemes and/or short-range wireless communication schemes supported by the electronic device 400.

According to an embodiment, the first communication connection and the second communication connection may include communication parameters configured differently in the same communication scheme. For example, the first and second communication connections may include a case in which a specific parameter (e.g., a wake to sleep time and/or a delivery traffic indication message interval) is configured differently in a connection state through the WiFi network. In another example, the first and second communication connections may include a case in which a specific parameter (e.g., a scan interval) is configured differently in a connection state through the Bluetooth or Bluetooth low energy (BLE) network.

According to an embodiment, the first and second communication connections may have different communication schemes from each other.

According to an embodiment, the first communication connection may include a communication connection based on any one of 4G mobile communication schemes (e.g., long-term evolution (LTE), LTE-advanced (LTE-A), LTE advanced pro (LTE-A pro)).

According to an embodiment, the second communication connection may include a communication connection based on any one (e.g., using a frequency band of about 6 GHz or less) of 5G mobile communication schemes (e.g., 5G or NR).

According to an embodiment, the first communication connection may include a communication connection using a 5G below 6 GHz frequency, and the second communication connection may include a communication connection using a 5G above 6 GHz frequency.

According to an embodiment, the first communication connection may include a communication connection through one (e.g., 2.4 GHz frequency band) of a plurality of links based on a plurality of bands or channels in accordance with a multi-link operation based on IEEE 802.11be (e.g., WiFi 7).

According to an embodiment, the second communication connection may include a communication connection through one (e.g., 5 GHz or 6 GHz frequency band) of a plurality of links based on a plurality of bands or channels in accordance with a multi-link operation based on IEEE 802.11be.

According to an embodiment, when the electronic device 400 is changed from the second form to the first form, the processor 420 may control the communication module 190 to perform communication through the second communication connection. For example, when the form of the electronic device 400 is changed from the unfolded form to the folded form, the processor 420 may control the communication module 190 to perform communication through the first communication connection. For example, the processor 420 may perform handover from the second communication connection to the first communication connection. For example, the handover may include a procedure of releasing a connection through an existing communication medium and establishing a connection through another communication medium. In another example, the handover may include a procedure of further establishing a connection through another communication medium without releasing an existing communication connection. For example, the processor 420 may release the second communication connection and perform the first communication connection. For example, the processor 420 may release the second communication connection (e.g., 5G communication connection) and change the communication connection to the first communication connection (e.g., 4G communication connection). For example, changing the communication connection from the 5G connection to the LTE connection may be referred to as LTE fallback. For example, the LTE fallback may include operations that the electronic device 400 switches the connection to legacy cellular communication (e.g., LTE communication) via the first communication circuit while connecting the 5G cellular communication (e.g., NR or 5G mobile communication) via the second communication circuit. The LTE fallback will be described later in detail. For example, the processor 420 may perform handover from the second communication connection of WiFi 5 GHz (or 6 GHz) with high data throughput to the first communication connection of WiFi 2.4 GHz with low data throughput.

According to an embodiment, although not shown, when the form of the electronic device 400 is changed from the first form (e.g., the folded form) to the second form (e.g., the unfolded form), the processor 420 may control the communication module 190 to perform communication through the second communication connection. For example, the processor 420 may perform handover from the first communication connection to the second communication connection. For example, the processor 420 may release the first communication connection and perform the second communication connection. For example, the processor 420 may perform the communication connection through the 5G communication network (e.g., 5G or NR). For example, the processor 420 may perform handover to the second communication connection of WiFi 5 GHz or 6 GHz having high data throughput.

According to an embodiment, in case that there is a change in the form of the electronic device 400, if a given time has not passed since the last handover is performed, the current communication connection may be maintained and handover to another communication connection may be performed when a specified situation occurs such as when the given time has elapsed, when the changed form is maintained for a certain time or more, or when a request for a specific service (e.g., streaming service) with high data throughput is received. Therefore, unnecessary repetition of handover can be avoided.

According to an embodiment, in case that the form of the electronic device 400 is changed from the unfolded form to the folded form, if a nearby connectible 2.4 GHz access point (AP) is discovered while a 5 GHz AP is connected via WiFi communication, handover to the 2.4 GHz AP may be performed. In this case, the handover may be performed when electric field strength such as RSSI of the 2.4 GHz AP is greater than or equal to a specified threshold.

According to an embodiment, in case that the form of the electronic device 400 is changed from the folded form to the unfolded form, if a nearby connectible 5 GHz AP is discovered while a 2.4 GHz AP is connected via WiFi communication, handover to the 5 GHz AP may be performed. In this case, the handover may be performed when electric field strength such as RSSI of the 5 GHz AP is greater than or equal to a specified threshold.

According to an embodiment, the first communication connection and the second communication connection may include a case in which a specific parameter (e.g., a wake to sleep time and/or a delivery traffic indication message interval) is configured differently in a connection state through the WiFi network. In this case, when the first communication module 440 is used, the processor 420 may perform the first and second communication connections using the same first communication module 440. Alternatively, when the second communication module 450 is used, the processor 420 may perform the first and second communication connections using the same second communication module 450.

According to an embodiment, as a communication parameter is configured differently as described above, the processor 420 may control the first communication module 440 to transmit and receive data through the first communication connection or the second communication connection. Alternatively, as a communication parameter is configured differently as described above, the processor 420 may control the second communication module 450 to transmit and receive data through the first communication connection or the second communication connection.

According to an embodiment, when the form of the electronic device 400 is changed from the unfolded form to the folded form, the processor may change various configurations, such as a delivery traffic indication message (DTIM) interval, of the electronic device 400 to the AP with or without performing a handover independently of performing a handover to the 5 GHz AP. The DTIM interval may refer to a beacon period between DTIM frames. For example, if the DTIM interval is configured to be short, the electronic device 400 can receive data quickly when there is data to be received, whereas standby current consumption may increase as the electronic device 400 wakes up in a short period. Therefore, in the folded state where the electronic device 400 provides limited services, the DTIM may be configured to a relatively long interval to reduce current consumption. Also, in the unfolded state where various services are provided, the DTIM may be configured to a short interval to enable fast data reception.

According to an embodiment, in the unfolded form of the electronic device 400, a next data reception waiting time (wake to sleep time) before entering a sleep state after receiving a data packet may be configured as a short length (e.g., 50 ms), so that standby power consumption can be reduced by entering the sleep state within a short time or immediately after receiving data in the WiFi network connection state.

According to an embodiment, in the folded form of the electronic device 400, the wake to sleep time may be configured as a long or normal length (e.g., 200 ms), so that continuous data reception is possible by entering the sleep state after waiting for data reception for a certain time from data reception in the WiFi network connection state. However, even in this case, the wake to sleep time may be configured as a relatively short length (e.g., 100 ms) when the data is not continuous as a result of data pattern analysis.

According to an embodiment, the first and second communication connections may include a case in which a specific parameter (e.g., scan interval) is configured differently in a connection state through the Bluetooth low energy (BLE) network.

According to an embodiment, in the folded form of the electronic device 400, the current consumption may be reduced by configuring not to perform a scan operation for a peripheral Bluetooth or BLE device or by configuring the scan interval to be long. For example, in the folded state, because the operation of discovering and connecting to a peripheral BLE device may not be performed, the current consumption may be reduced by not performing the scan operation.

According to an embodiment, in the unfolded form of the electronic device 400, the scan of Bluetooth or BLE devices may be performed at a certain interval. For example, in the unfolded state, because the operation of discovering and connecting to a peripheral Bluetooth or BLE device may be performed, the scan operation may be periodically performed to receive a service.

Figure 9:
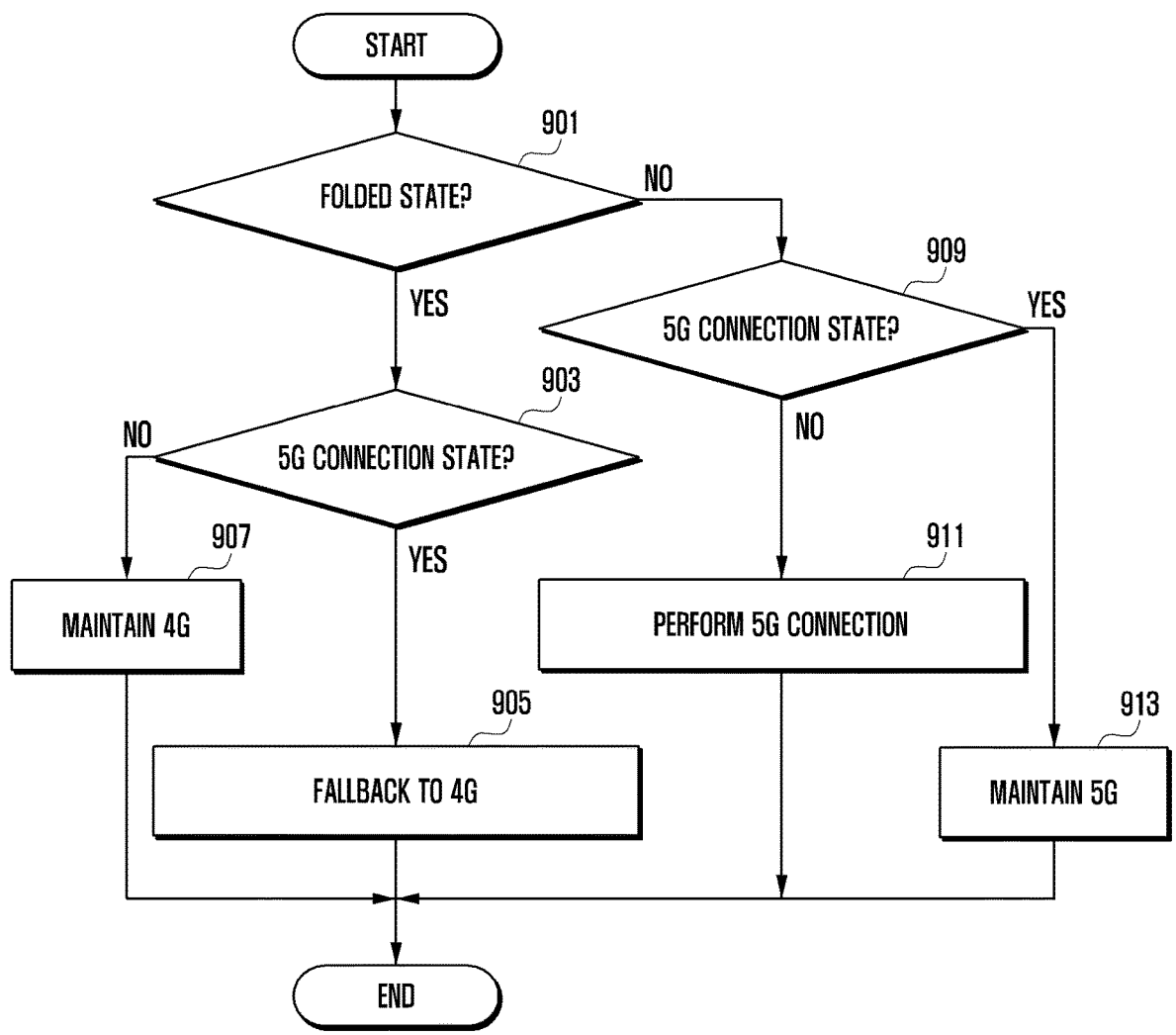
FIG. 9 is a flowchart illustrating an example communication control operation of an electronic device according to various embodiments.

FIG. 9 is a flowchart illustrating an example communication control operation of an electronic device (e.g., the electronic device 400 in FIG. 4 to FIG. 7) according to various embodiments.

According to various embodiments, at operation 901, a processor (e.g., the processor 420 in FIG. 4) of the electronic device 400 may determine whether the form of the electronic device 400 is a folded state.

According to an embodiment, if the form of the electronic device 400 is the folded state, the processor 420 may determine at operation 903 whether the electronic device 400 is currently in a state of a second communication connection (e.g., 5G communication connection) through the communication module 190.

According to an embodiment, if it is determined that the electronic device is in the 5G connection state, the processor 420 may fall back the communication connection to 4G at operation 905. For example, the processor 420 may perform handover to a first communication connection from the second communication connection. For example, the processor 420 may release the second communication connection and perform the first communication connection. For example, 4G fallback may include operations that the electronic device 400 switches the connection to legacy cellular communication (e.g., LTE communication) via a first communication circuit while connecting 5G cellular communication (e.g., NR or 5G mobile communication) via a second communication circuit.

According to an embodiment, the processor 420 may wait for 5G release in the 5G connection state and then, if the 5G connection is released, may not request the 5G connection thereafter.

According to an embodiment, for 5G connection release, the processor 420 may transmit a connection release request signal to a base station. For example, the connection release request signal may include, for example, a SCGFailureInformation message.

According to an embodiment, if it is determined that the electronic device is not in the 5G connection state, the processor 420 may maintain the communication connection as the first communication connection, e.g., 4G at operation 907. For example, the processor 420 may identify the current 5G communication connection as being in an inactive state (NR idle) and, in this case, maintain the 5G inactivation.

According to an embodiment, if the form of the electronic device 400 is not the folded state, the processor 420 may determine at operation 909 whether the electronic device 400 is currently in a state of the second communication connection (e.g., 5G communication connection) through the communication module 190.

According to an embodiment, if it is determined at the operation 909 that the electronic device 400 is not in the 5G communication connection state, the processor 420 may perform the 5G connection at operation 911. For example, when 5G is in an inactive state (NR idle), the processor 420 may perform a 5G scan for a receivable frequency band and request the 5G connection from the base station 410.

According to an embodiment, if it is determined at the operation 909 that the electronic device 400 is in the 5G communication connection state, the processor 420 may maintain the 5G connection at operation 913.

Figure 10:
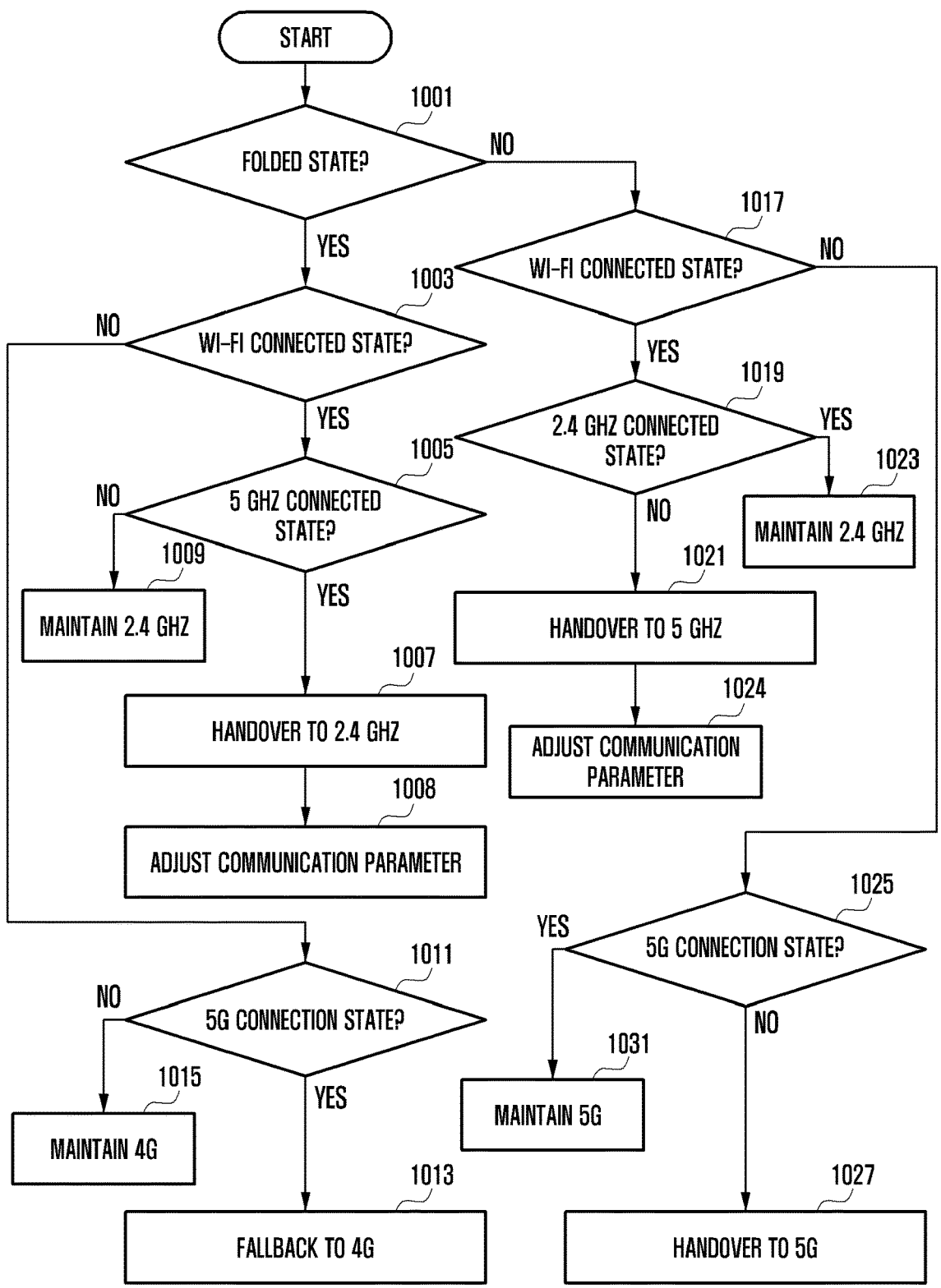
FIG. 10 is a flowchart illustrating an example communication control operation of an electronic device according to various embodiments.

FIG. 10 is a flowchart illustrating an example communication control operation of an electronic device (e.g., the electronic device 400 in FIG. 4 to FIG. 7) according to various embodiments.

According to various embodiments, at operation 1001, a processor (e.g., the processor 420 in FIG. 4) of the electronic device 400 may determine whether the form of the electronic device 400 is a folded state.

According to an embodiment, if the form of the electronic device 400 is the folded state, the processor 420 may determine at operation 1003 whether the electronic device 400 is currently in a state of being connected to the WiFi communication network through the communication module 190.

According to an embodiment, if the electronic device 400 is in a state of being connected to the WiFi communication network, the processor 420 may determine at operation 1005 whether the electronic device 400 is in a state of being connected to the WiFi communication network in a 5 GHz (or 6 GHz) frequency band.

According to an embodiment, if the electronic device 400 is in a state of being connected to the WiFi communication network in the 5 GHz (or 6 GHz) frequency band, the processor 420 may handover to a 2.4 GHz frequency band at operation 1007.

According to an embodiment, at operation 1008, the processor 420 may adjust a communication parameter for 2.4 GHz frequency band WiFi communication of the electronic device 400. For example, the processor 420 may configure a delivery traffic indication message (DTIM) interval of the electronic device 400 as a low interval (e.g., 300 ms). For example, the processor 420 may configure a wake to sleep time as a short length (e.g., 50 ms), so that standby power consumption can be reduced by entering the sleep state within a short time or immediately after receiving data in the WiFi network connection state.

According to an embodiment, if the electronic device 400 is not in a state of being connected to the WiFi communication network in the 5 GHz (or 6 GHz) frequency band, the processor 420 may maintain the WiFi communication network in a 2.4 GHz frequency band at operation 1009.

According to an embodiment, at operation 1011, the processor 420 may, when it is determined that the electronic device is not in the WiFi connected state in operation 1003, determine whether the electronic device 400 is in a 5G communication connection state.

According to an embodiment, if it is determined that the electronic device is in the 5G connection state, the processor 420 may fall back the communication connection to 4G at operation 1013. For example, in the 5G communication connection state, the processor 420 may release the 5G communication connection and perform the 4G communication connection. For example, 4G fallback may include operations that the electronic device 400 switches the connection to legacy cellular communication (e.g., LTE communication) via a first communication circuit while connecting 5G cellular communication (e.g., NR or 5G mobile communication) via a second communication circuit.

According to an embodiment, if it is determined that the electronic device is not in the 5G connection state at operation 1011, the processor 420 may maintain the communication connection as the 4G communication connection at operation 1015.

According to an embodiment, if it is determined at the operation 1001 that the form of the electronic device 400 is not the folded state, the processor 420 may determine at operation 1017 whether the electronic device 400 is currently in a state of being connected to the WiFi communication network through the communication module 190.

According to an embodiment, if the electronic device 400 is in a state of being connected to the WiFi communication network in operation 1017, the processor 420 may determine at operation 1019 whether the electronic device 400 is in a state of being connected to the WiFi communication network in a 2.4 GHz frequency band.

According to an embodiment, if the electronic device 400 is not in a state of being connected to the WiFi communication network in the 2.4 GHz frequency band in operation 1019, the processor 420 may handover to a 5 GHz (or 6 GHz) frequency band at operation 1021.

According to an embodiment, at operation 1024, the processor 420 may adjust a communication parameter for 5 GHz (or 6 GHz) frequency band WiFi communication of the electronic device 400. For example, the processor 420 may configure a delivery traffic indication message (DTIM) interval of the electronic device 400 as a high interval (e.g., 900 ms). For example, the processor 420 may configure a wake to sleep time of the electronic device 400 as a long or normal length (e.g., 200 ms), so that continuous data reception is possible by entering the sleep state after waiting for data reception for a certain time from data reception in the WiFi network connection state. However, even in this case, the wake to sleep time may be configured as a short length (e.g., 50 ms) when the data is not continuous as a result of data pattern analysis.

According to an embodiment, if the electronic device 400 is in a state of being connected to the WiFi communication network in the 2.4 GHz frequency band in operation 1019, the processor 420 may maintain the WiFi communication network in the 2.4 GHz frequency band at operation 1023.

According to an embodiment, at operation 1025, when it is determined in operation 1017 that the electronic device is not in the WiFi connected state, the processor 420 may determine whether the electronic device 400 is in the 5G communication connection state.

According to an embodiment, if it is determined that the electronic device is not in the 5G connection state in operation 1025, the processor 420 may handover the communication connection to 5G at operation 1027. For example, the processor 420 may perform the 5G communication connection in the 4G communication connection state. For example, the processor 420 may release the 4G communication connection and perform the 5G communication connection. For example, this operation of handover to 5G may include operations that the electronic device 400 switches to 5G cellular communication (e.g., NR or 5G mobile communication) via a second communication circuit while connecting legacy cellular communication (e.g., LTE communication) via a first communication circuit.

According to an embodiment, if it is determined at the operation 1025 that the electronic device is in the 5G connection state, the processor 420 may maintain the 5G communication connection state at operation 1031.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a housing;
   a flexible display;
   a communication circuit;
   at least one processor including processing circuitry operatively connected to the communication circuit; and
   memory storing instructions that, when executed by the at least one processor individually or collectively, cause the electronic device to:
   identify whether the housing is in a folded state or an unfolded state,
   based on identifying that the housing is in the unfolded state, set a delivery traffic indication message (DTIM) interval of a WiFi communication using the communication circuit to a first value, and
   based on identifying that the housing is changed from the unfolded state to the folded state, set the DTIM interval of the WiFi communication using the communication circuit to a second value greater than the first value.

2. The electronic device of claim 1,
   wherein the instructions, that when executed by the at least one processor individually or collectively, further cause the electronic device to:
   based on identifying that the housing is changed from the unfolded state to the folded state, perform a communication connection in a first communication connection scheme different from a second communication connection scheme,
   wherein the first communication connection scheme includes a first communication connection based on a 4th generation (4G) mobile communication scheme, and the second communication connection scheme includes a second communication connection based on a 5th generation (5G) mobile communication scheme.

3. The electronic device of claim 2, wherein the instructions, that when executed by the at least one processor individually or collectively, further cause the electronic device to:
   based on identifying that the housing is changed from the folded state to the unfolded state, control the communication circuit to:
   release the first communication connection designated for the folded state, and
   perform communication through the second communication connection designated for the unfolded state.

4. The electronic device of claim 3, wherein the instructions, that when executed by the at least one processor individually or collectively, further cause the electronic device to control the communication circuit to transmit a first communication connection request message to a base station to release the first communication connection.

5. The electronic device of claim 4, wherein the instructions, that when executed by the at least one processor individually or collectively, further cause the electronic device to control the communication circuit to not transmit the first communication connection request message after waiting for release of the first communication connection.

6. The electronic device of claim 1, wherein the instructions, that when executed by the at least one processor individually or collectively, further cause the electronic device to:
   based on identifying that the housing is changed from the unfolded state to the folded state, change a wake to sleep time to be different from an interval in the unfolded state, the wake to sleep time being a next data reception waiting time after receiving a data packet.

7. The electronic device of claim 6, wherein the instructions, that when executed by the at least one processor individually or collectively, further cause the electronic device to change the wake to sleep time to be longer based on continuous reception being identified by analyzing a reception pattern of the data packet upon receiving the data packet.

8. The electronic device of claim 1, wherein the instructions, that when executed by the at least one processor individually or collectively, further cause the electronic device to control the communication circuit to:
   periodically scan a Bluetooth low energy (BLE) device in response to a BLE or Bluetooth (BT) communication connection in the unfolded state, and
   limit a scan operation for the BLE device in response to a change to the folded state.

9. A method of operating an electronic device including a flexible display, the method comprising:
   identifying whether a housing of the electronic device is in a folded state or an unfolded state,
   based on identifying that the housing is in the unfolded state, setting a delivery traffic indication message (DTIM) interval of a WiFi communication to a first value, and
   based on identifying that the housing is changed from the unfolded state to the folded state, setting the DTIM interval of the WiFi communication to a second value greater than the first value.

10. The method of claim 9, further comprising:
    based on identifying that the housing is changed from the unfolded state to the folded state, performing a communication connection in a first communication connection scheme different from a second communication connection scheme,
    wherein the first communication connection scheme includes a first communication connection based on a 4th generation (4G) mobile communication scheme, and the second communication connection scheme includes a second communication connection based on a 5th generation (5G) mobile communication scheme.

11. The method of claim 10, further comprising:
identifying that the housing is changed from the folded state to the unfolded state; and
based on identifying a change to the unfolded state, releasing the first communication connection designated for the folded state and performing communication through the second communication connection designated for the unfolded state.

12. The method of claim 11, further comprising:
transmitting a first communication connection request message to a base station to release the first communication connection.

13. The method of claim 12, further comprising:
not transmitting the first communication connection request message after waiting for release of the first communication connection.

14. The method of claim 9, further comprising:
based on identifying that the housing is changed from the unfolded state to the folded state, changing a wake to sleep time to be different from an interval in the unfolded state, the wake to sleep time being a next data reception waiting time after receiving a data packet.

15. The method of claim 14, further comprising:
changing the wake to sleep time to be longer based on continuous reception being identified by analyzing a reception pattern of the data packet upon receiving the data packet.

16. The method of claim 9, further comprising:
periodically scanning a Bluetooth low energy (BLE) device in response to a BLE or Bluetooth (BT) communication connection in the unfolded state, and
limiting a scan operation for the BLE device in response to a change to the folded state.

* * * * *